(No Model.) 2 Sheets—Sheet 1.
H. H. HOSFORD.
ELECTRIC MOTOR OR DYNAMO ELECTRIC MACHINE.
No. 470,194. Patented Mar. 8, 1892.

Witnesses
C. E. Ashley
H. W. Lloyd.

Inventor
Henry H. Hosford
By his Attorney
Charles J. Kintner

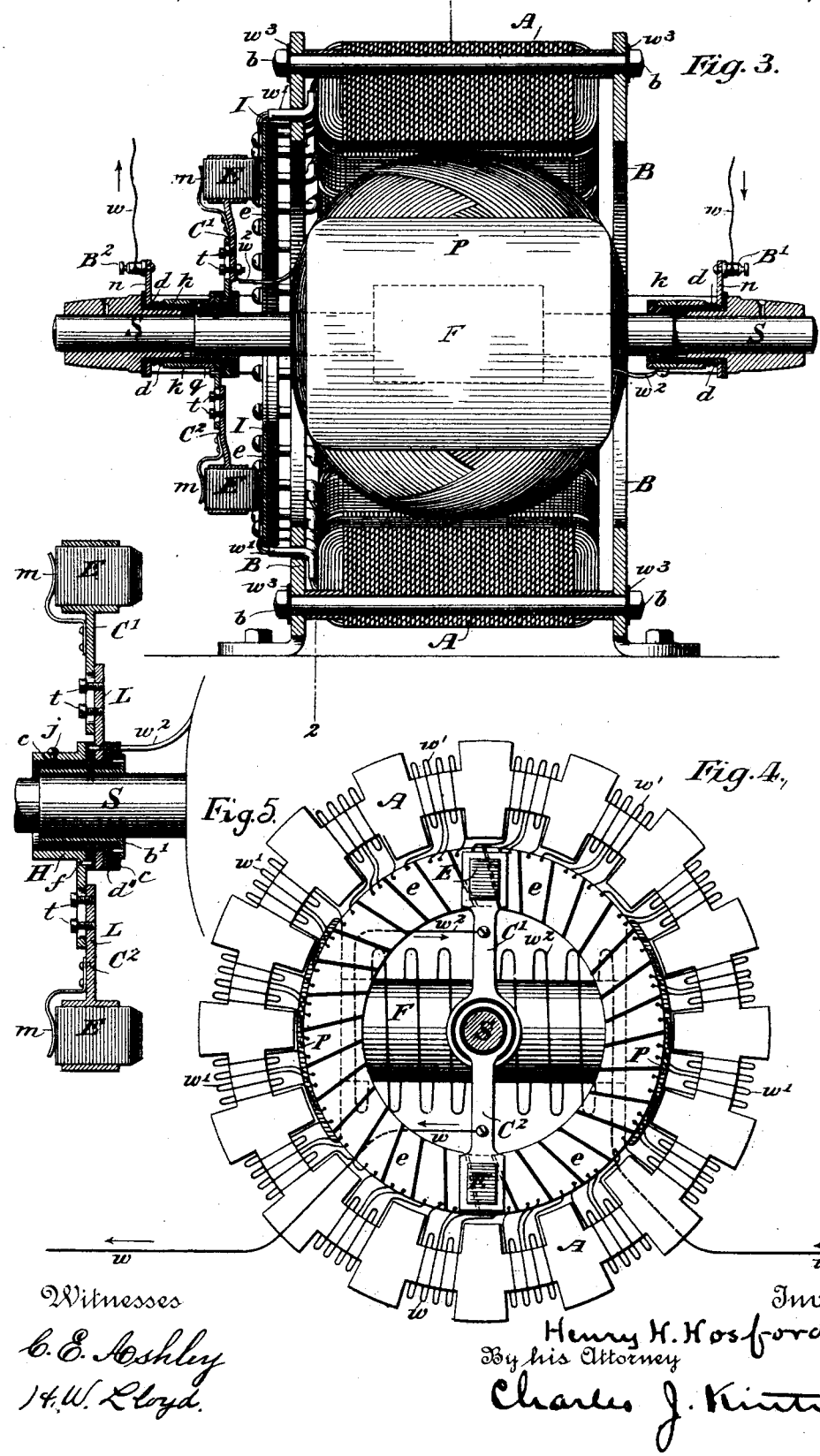

UNITED STATES PATENT OFFICE.

HENRY H. HOSFORD, OF CLEVELAND, OHIO, ASSIGNOR OF ONE-HALF TO CHARLES W. FOOTE, OF SAME PLACE.

ELECTRIC MOTOR OR DYNAMO-ELECTRIC MACHINE.

SPECIFICATION forming part of Letters Patent No. 470,194, dated March 8, 1892.

Application filed June 4, 1891. Serial No. 395,018. (No model.)

*To all whom it may concern:*

Be it known that I, HENRY H. HOSFORD, a citizen of the United States, residing at Cleveland, in the county of Cuyahoga and State of Ohio, have made a new and useful invention in Electric Motors or Dynamo-Electric Machines, of which the following is a specification.

My invention has for its objects the construction of an electric motor or dynamo-electric machine which shall be as compact as possible, present a minimum amount of resistance to the magnetic lines of force passing between the field-magnet and the armature, have a low internal resistance with a minimum leakage of the lines of force, be simple in the organization of its parts, and cheaply and easily made. These several objects are accomplished by the use of the apparatus hereinafter described, and particularly pointed out in the claims which follow this specification.

In order that my invention may be fully understood, reference is had to the accompanying drawings, in which—

Figure 2:
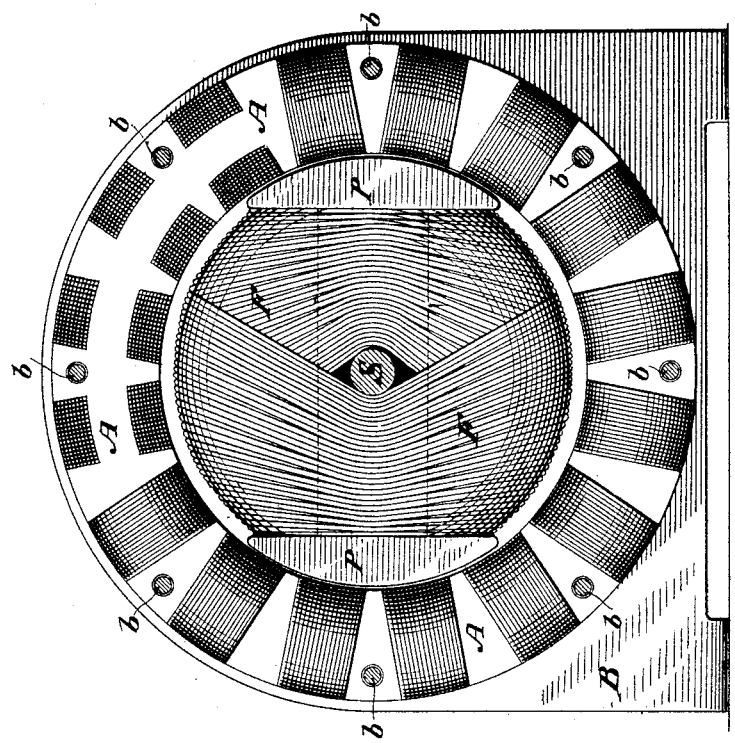
Figure 1:
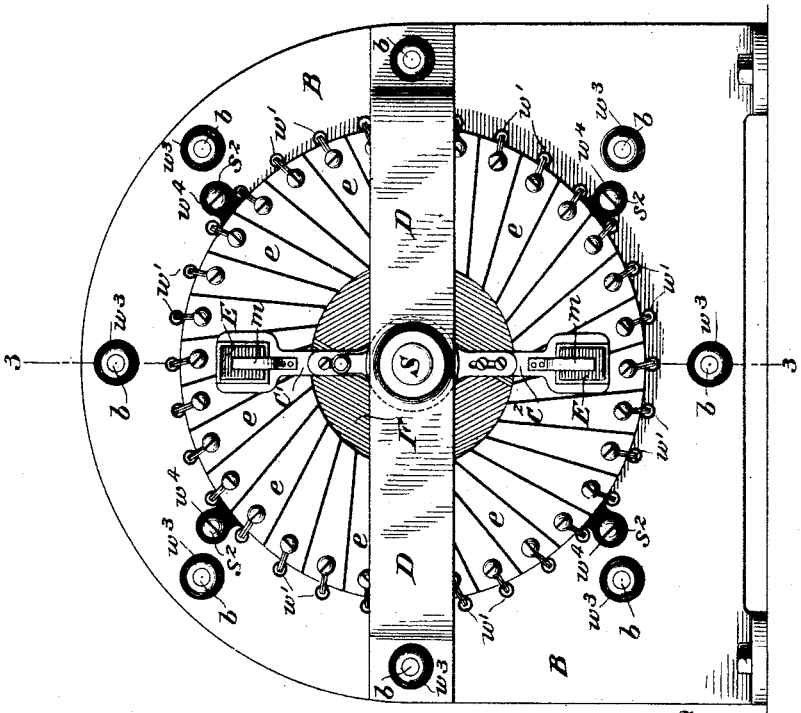

Figure 1 represents an end elevational view of my improved machine. Fig. 2 is an elevational view, partly in section, taken on line 2 2, Fig. 3. Fig. 3 is a sectional elevational view taken on line 3 3, Fig. 1; and Fig. 4, a diagrammatic view showing the circuit connections. Fig. 5 is an enlarged detail view showing the rotary commutator-brushes and their electrical connections, together with novel means for adjusting them radially and axially.

The essential feature of my improved machine lies in the fact that I utilize a stationary armature, preferably of the Gramme type, made of laminated core-pieces, bound together by bolts and sustained in side frame-pieces or supports with a rotary internal field-magnet, preferably of the Siemens H type, having rotary commutator-brushes carried by the shaft, which supports the field-magnet, and made adjustable axially and radially, the commutator-strips being supported at one side of the frame of the machine, and all having an angular relation to the commutator-brushes.

Referring now to the drawings in detail, B B represent the side supports, which constitute the frame of the machine, each being preferably cast or stamped out of a single piece of metal and provided with legs or feet, which may be bolted to the floor, as shown.

A represents the armature, preferably of the Gramme type, made of notched laminated core-pieces held together by bolts $b\ b$, insulated from the frame by washers and insulating-tubes $w^3\ w^3$. This armature is wound as Gramme rings are usually wound, and the ends of the conductors $w'$ are connected to a circular series of commutator-strips $e$, arranged, as shown in Figs. 3 and 4, on an insulating base or support I, so that their sides have an angular relation to the commutator-brushes E E, supported or sustained through holders $C'\ C^2$, said brush-holders being in turn carried by and insulated from the shaft S, which supports the rotary field-magnet F. This angular arrangement of the commutator-strips is designed to prevent sparking at the brushes by giving to them longitudinal adjustment, as it will be readily understood that by lengthening and shortening the brush-holders $C'\ C^2$, through the agency of the adjusting-screws $t\ t$, the necessary lead may be attained.

The brushes E are preferably blocks of carbon and are sustained in frictional bearing with the commutator-strips by sleeves, as shown in Fig. 3, under pressure of springs $m\ m$.

The rotary field-magnet F is wound, preferably, on a lathe by centering it at its diagonal opposite corners, so that the winding when complete is not unlike that of a ball of twine, the cross-bearing between the successive layers being such as to prevent any shifting or slipping thereof and making it as compact and secure as possible.

An examination of Figs. 2 and 3 will disclose the nature of the winding, which is continuous in one direction in alternate layers and on opposite sides of the shaft.

$k\ k$ represent adjustable conducting-sleeves which fit accurately over insulating-sleeves borne by the stationary portions of the side bars D and adjustable longitudinally on said sleeves under the influence of conducting-springs $d$, the conducting-springs being in contact with contacting-plates $n$, which carry the binding-posts B' B², connected to the conductors $w$. The inner ends of these sliding sleeves $k$ bear against corresponding conducting-sleeves $q\ q$, one of which is connected to the commutator-brushes and the other to the conductor $w^2$, which passes to the rotary field-magnet.

When used as a motor, the operation of the apparatus is as follows: The current passes in the direction of the arrow through the conductor $w$, as shown on the right of Figs. 3 and 4, to the binding-post B', thence by the conducting-plates $n$, coil-spring $d$, sliding sleeve $k$ to the rotary sleeve $q$, carried by the shaft S, thence to conductor $w^2$ on the rotary field-magnet to the upper brush-holder C' through the carbon brush E, thence to the commutator-strip $e$, on which it rests, through the conductors $w'$ of the armature in contact with commutator-strip $e$ to the other brush E by the lower brush-holder C² to the rotary sleeve $q$, thence to the sliding stationary sleeve $k$, spring $d$, plate $n$, binding-post B², conductor $w$ to the other pole of the generator. The field-magnet is thus set in rotation and the brushes caused to advance to successive commutator-segments as they rotate. Should there be any tendency to spark, the brushes E are adjusted either outwardly or inwardly, as the case demands, by removing the adjustment-screws $t\ t$ and lengthening or shortening the brush-holding arm C' C².

In the enlarged detail drawing in Fig. 5 I show my improved means for sustaining the commutator-brushes adjustably upon the shaft S, so that they may be located at various angles thereon with relation to the stationary commutator-plates $e$.

$b'$ is a metallic sleeve fitting snugly over the shaft S and secured thereto by a set-screw, which passes through it and a surrounding non-conducting sleeve $c$, the two sleeves $b'$ and $c$ being secured together by pins, as shown. On the inner face of the shouldered end of the non-conducting sleeve $c$ is a metallic conducting-ring $d'$, which is electrically connected with the conductor $w^2$, passing to the field-magnet.

H is a second metallic sleeve which fits snugly over the non-conducting sleeve $c$ and is secured thereto by pins $f$, the extended shoulder on one side thereof constituting the support for the lower commutator-brush holder C², held in place by the set-screws $t\ t$. The upper commutator-brush C' is secured in the same manner by set-screws to a corresponding arm L, which in turn is attached through the agency of pins to the inner end of the non-conducting sleeve $c$, and carries a conducting-band adapted to fit closely against the conducting-band $d'$.

$j$ is a set-screw extending through the outer sleeve H and adapted to bear against the non-conducting sleeve $c$.

It will be understood that on the removal of the set-screw $j$ the angular position of the brushes on the shaft S may be adjusted at pleasure, after which all of said parts may be permanently secured to the shaft by the aforesaid set-screw. It is equally clear, also, that through the agency of the extensible arms C' C² and fixed arms L and set-screws $t$ radial adjustment may be given to the commutator-brushes E, and also through the medium of the concentric sleeves $c$ and H, as already described, the desired axial adjustment may be attained. This feature of compound radial and axial adjustment I regard as of especial importance, and my claims hereinafter directed to this particular are designed to be of such scope as to include any and all means of attaining this double adjustment of commutator-brushes.

I am aware that it is not new with me, broadly, to construct an electric motor or dynamo-electric machine with a stationary armature of the Gramme type having laminated core-pieces and an internal rotary field-magnet, and I make no claim to a construction broad enough to include such a machine.

I am not aware that any one has heretofore devised an electric motor or dynamo-electric machine in which the stationary armature is held together by side frame-pieces and bolts extending therethrough, in combination with a rotary field-magnet carrying rotary brushes and provided with sliding-sleeve brushes which connect the field-magnet coil or coils to the external circuit; nor am I aware that any one has heretofore arranged a set of stationary commutator-strips in such manner as to bear a diagonal or angular relation to the rotary brushes, whereby the latter may be adjusted radially to prevent injurious sparking; nor has any one, so far as I am aware, constructed the rotary part of an electric motor of the Siemens H type by winding the conductor thereon in successive diagonal layers, as herein shown and described.

Having thus described my invention, what I claim, and desire to secure by Letters Patent of the United States, is—

1. A dynamo-electric machine or electric motor having a rotary field-magnet and a stationary ring-armature provided with laminated core-pieces bolted together and to sustaining or side supports, with a fixed commutator composed of conducting bars or strips having an angular relation to the commutator-brushes and their holders, substantially as described.

2. A dynamo-electric machine or electric motor having a stationary ring-armature, a rotary field-magnet mounted on a shaft passing through the armature, a pair of adjustable rotary commutator-brushes, and a fixed commutator, the individual bars thereof having an angular relation to the brushes and their holders, substantially as described.

3. A dynamo-electric machine or electric motor having a stationary ring-armature, a rotary field-magnet, a fixed commutator, a pair of rotary brushes carried by the shaft which supports the field-magnet, a fixed commutator, and a pair of conducting-sleeves surrounding the shaft and having contact with a similar pair of conducting-sleeves carried by the same shaft and connected electrically to the field-magnet coil, substantially as described.

4. A dynamo-electric machine or electric motor having a stationary ring-armature with internally-projecting pole-pieces, a rotary field-magnet, a fixed commutator, and two rotary and two stationary brushes, the latter being in the nature of sliding sleeves having end bearings on corresponding conducting-sleeves borne by the field-magnet shaft with electrical connections, substantially as described.

5. A dynamo-electric machine or electric motor having a fixed ring-armature, a fixed commutator, a pair of rotary brushes, a pair of sliding conducting-sleeves, and a corresponding pair of fixed conducting-sleeves having bearing on the sliding sleeves, in combination with springs for causing the sliding sleeves to maintain continuous electrical contact with the fixed sleeves carried by the rotary part, substantially as described.

6. The described commutator or contact attachment for maintaining electical continuity between the rotary and the stationary part of an electric motor, consisting of a fixed sleeve or ring carried by the rotary part, and a sliding sleeve attached to the stationary part, but having end bearing against the fixed sleeve, and provided with a yielding spring for maintaining the two parts in contact continually, substantially as described.

7. A current-conducting device for an electric motor consisting of a sliding spring-pressed conducting-sleeve surrounding the shaft which carries the rotary part, but attached to the fixed part, and a fixed sleeve having end bearing against the sliding sleeve and carried by the rotary part, substantially as described.

8. A commutator consisting of a series of stationary conducting-bars arranged in a circle, with their edges inclined to all diameters of the circle, in combination with a pair of commutator-brushes and brush-holders, carried by a rotary shaft having adjustable means for varying the position of the brushes, substantially as described.

9. An armature or field-magnet having a core of the Siemens H type wound with alternate layers of diagonally-disposed conducting-wire, substantially as described.

10. An armature or field-magnet having a core made of a single piece of metal mounted on an axis and wound with alternate layers of diagonally-disposed conducting-wire, substantially as described.

11. An armature or field-magnet for an electric motor or dynamo-electric machine, having a core mounted on an axis and wound with alternate layers of diagonally-disposed conducting-wires, substantially as described.

HENRY H. HOSFORD.

Witnesses:
NELLIE L. McLANE,
SHELDON PARKS.